US009736211B2

(12) United States Patent
Veeraiyan

(10) Patent No.: US 9,736,211 B2
(45) Date of Patent: Aug. 15, 2017

(54) METHOD AND SYSTEM FOR ENABLING MULTI-CORE PROCESSING OF VXLAN TRAFFIC

(71) Applicant: VMware, Inc., Palo Alto, CA (US)

(72) Inventor: Ayyappan Veeraiyan, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 283 days.

(21) Appl. No.: 13/954,884

(22) Filed: Jul. 30, 2013

(65) Prior Publication Data

US 2014/0059111 A1 Feb. 27, 2014

Related U.S. Application Data

(60) Provisional application No. 61/693,523, filed on Aug. 27, 2012.

(51) Int. Cl.
*H04L 29/08* (2006.01)
*H04L 12/46* (2006.01)
*H04L 12/26* (2006.01)

(52) U.S. Cl.
CPC .......... *H04L 67/02* (2013.01); *H04L 12/4633* (2013.01); *H04L 43/026* (2013.01); *H04L 67/10* (2013.01); *H04L 43/0882* (2013.01)

(58) Field of Classification Search
CPC ....... H04L 67/02; H04L 67/10; H04L 43/026; H04L 43/0882; H04L 12/4633
See application file for complete search history.

(56) References Cited

U.S. PATENT DOCUMENTS

| 6,456,590 B1* | 9/2002 | Ren | H04L 47/10 |
| | | | 370/229 |
| 2007/0217409 A1* | 9/2007 | Mann | H04L 63/123 |
| | | | 370/389 |

(Continued)

OTHER PUBLICATIONS

IETF, "A Framework for Overlaying Virtualized Layer 2 Networks over Layer 3 Networks", Aug. 26, 2011, 20 pages.*

(Continued)

*Primary Examiner* — Brian J Gillis
*Assistant Examiner* — Amy Ling
(74) *Attorney, Agent, or Firm* — Patterson & Sheridan, LLP

(57) ABSTRACT

The disclosure herein describes a computer system that facilitates multi-core processing of VXLAN encapsulated packets. A VXLAN encapsulated packet typically contains an outer Ethernet header, an outer IP header, an outer UDP header, and an inner Ethernet header. The computer system hosts virtualization software which includes a virtual switch, a VXLAN module, and a load balancer. The load balancer monitors a port on the virtual switch. This port is dedicated to receiving VXLAN encapsulated packets and can be referred to as a VXLAN VMKNIC port. When the traffic statistics on the VXLAN VMKNIC port surpasses a predetermined threshold, the load balancer can instruct the physical network interface to allocate a number of receiver side scaling (RSS) queues. In turn, the physical network interface can store received VXLAN encapsulated packets in a number of RSS receive queues which facilitates multi-core processing of the received encapsulated packets.

18 Claims, 5 Drawing Sheets

(56) References Cited

U.S. PATENT DOCUMENTS

| | | | |
|---|---|---|---|
| 2009/0183183 A1* | 7/2009 | Muppirala | G06F 9/4411 |
| | | | 719/327 |
| 2010/0070677 A1* | 3/2010 | Thakkar | G06F 13/28 |
| | | | 711/6 |
| 2011/0265095 A1* | 10/2011 | Cardona et al. | 718/105 |
| 2011/0307889 A1* | 12/2011 | Moriki | G06F 9/45558 |
| | | | 718/1 |
| 2012/0207174 A1* | 8/2012 | Shieh | 370/401 |
| 2013/0104124 A1* | 4/2013 | Tsirkin et al. | 718/1 |
| 2013/0166798 A1* | 6/2013 | Chandra | G06F 13/4081 |
| | | | 710/105 |
| 2013/0170490 A1* | 7/2013 | Kreeger et al. | 370/390 |
| 2013/0266019 A1* | 10/2013 | Qu | H04L 49/70 |
| | | | 370/395.53 |
| 2013/0329728 A1* | 12/2013 | Ramesh | H04L 12/462 |
| | | | 370/390 |
| 2015/0019748 A1* | 1/2015 | Gross et al. | 709/230 |

OTHER PUBLICATIONS

Intel, "Improving Network Performance in Multi-Core Systems, White Paper", 2007, Intel Corporation, 4 pages.*
Intel, "Intel VMDq Technology", Mar. 2008, Intel LAN Access Division, 22 pages.*
Wu et al., "A Transport-Friendly NIC for Multicore/Multiprocessory Systems", IEEE Computer Society, vol. 23, No. 4, Apr. 2012, p. 607-p. 615, 9 pages.*
Jones, "Virtual Networking in Linux", Oct. 27, 2010, IBM, 7 pages.*

\* cited by examiner

METHOD AND SYSTEM FOR ENABLING MULTI-CORE PROCESSING OF VXLAN TRAFFIC

This application claims the benefit of U.S. Provisional Application No. 61/693,523, entitled "Enabling Multi-Core Receive Processing of VXLAN Traffic in Hypervisor Using RSS Feature of PNICS," by inventor Ayyappan Veeraiyan, filed 27 Aug. 2012.

BACKGROUND

The exponential growth of the Internet has made it a ubiquitous delivery medium for a variety of applications. These applications have in turn brought with them an increasing demand for bandwidth. As a result, service providers race to build larger and faster data centers with versatile capabilities. Meanwhile, advances in virtualization technologies have made it possible to implement a large number of virtual machines (VMs) in a data center. These virtual machines can essentially operate as physical hosts and perform a variety of functions such as Web or database servers. Because virtual machines are implemented in software, they can freely migrate to various locations. This capability allows service providers to partition and isolate physical resources (e.g., computing power and network capacity) according to customer needs, and to allocate such resources dynamically.

While virtualization brings unprecedented flexibility to service providers, the conventional layer-2 network architecture, however, tends to be rigid and cannot readily accommodate the dynamic nature of virtual machines. For example, in conventional data center architecture, hosts are often inter-connected by one or more layer-2 (e.g., Ethernet) switches to form a layer-2 broadcast domain. The physical reach of a layer-2 broadcast domain is limited by the transmission medium. As a result, different data centers are typically associated with different layer-2 broadcast domains, and multiple layer-2 broadcast domains could exist within a single data center. For a VM in one data center to communicate with a VM or a storage device in another data center, such communication would need to be carried over layer-3 networks. That is, the packets between the source and destination have to be processed and forwarded by layer-3 devices (e.g., IP routers), since the source and destination belong to different layer-2 broadcast domains. While this architecture has benefits, flat layer-2 processing has its advantages.

One technique to solve the problems described above is to implement a virtual extensible local area network (VXLAN). VXLAN is a standard network virtualization technology managed by the Internet Engineering Task Force (IETF), and works by creating a logical layer-2 network that is overlaid above a layer-3 IP network. Ethernet packets generated by VMs are encapsulated in an IP header before they are transported to a remote location where the IP header is removed and the original Ethernet packet is delivered to the destination. The IP encapsulation mechanism allows a logical layer-2 broadcast domain to be extended to an arbitrary number of remote locations, and allows different data centers or different sections of the same data center (and hence the VMs and devices therein) to be in the same layer-2 broadcast domain. The VXLAN function typically resides within a host's hypervisor, and works in conjunction with the hypervisor's virtual switch. More details of VXLAN can be found in IETF draft "VXLAN: A Framework for Overlaying Virtualized Layer 2 Networks over Layer 3 Networks," which is incorporated by reference here.

Existing VXLAN implementations, however, cannot readily take advantage of some of the hardware-based off-loading features available in the physical network interface cards (PNICs). For example, certain types of PNICs allow allocation of separate receive queues for packets destined to different VMs based on their MAC address and/or virtual local area network (VLAN) tags, which can facilitate multi-core processing of the received packets and improve the throughput while reducing processing overhead on the CPUs. However, due to the nature of VXLAN encapsulation, the VXLAN packets received by a PNIC cannot readily benefit from such queuing.

SUMMARY

The disclosure herein describes a computer system that facilitates multi-core processing of VXLAN encapsulated packets in a virtualization environment. A VXLAN encapsulated packet typically contains an outer Ethernet header, an outer IP header, an outer UDP header, and an inner Ethernet header. The computer system hosts virtualization software which includes a virtual switch, a VXLAN module, and a load balancer. During operation, the load balancer monitors a port on the virtual switch. This port is dedicated to receiving VXLAN encapsulated packets and can be referred to as a VXLAN VMKNIC port.

When the traffic statistics on the VXLAN VMKNIC port surpasses a predetermined threshold, the load balancer can instruct the physical network interface to allocate a number of receiver side scaling (RSS) queues. In turn, the physical network interface can store received VXLAN encapsulated packets in a number of RSS receive queues which facilitates multi-core processing of the received encapsulated packets.

During operation, the physical network interface hashes a 5 tuple of a VXLAN encapsulated packet's outer source/destination IP addresses, source/destination UDP ports, and protocol to produce a hash result, and uses this hash result to distributed the received VXLAN encapsulated packets to multiple RSS receive queues. Because a VXLAN encapsulated packet's source UDP port is based on a hash of its inner TCP/IP header, packets destined for the same VM (or the same UDP flow) would be redirected to the same RSS receive queue and thus maintain the order of packet delivery. Hence, multi-core processing can be achieved for VXLAN encapsulated packets while maintaining in-order delivery of specific VM/flow packets.

DETAILED DESCRIPTION

Figure 1:
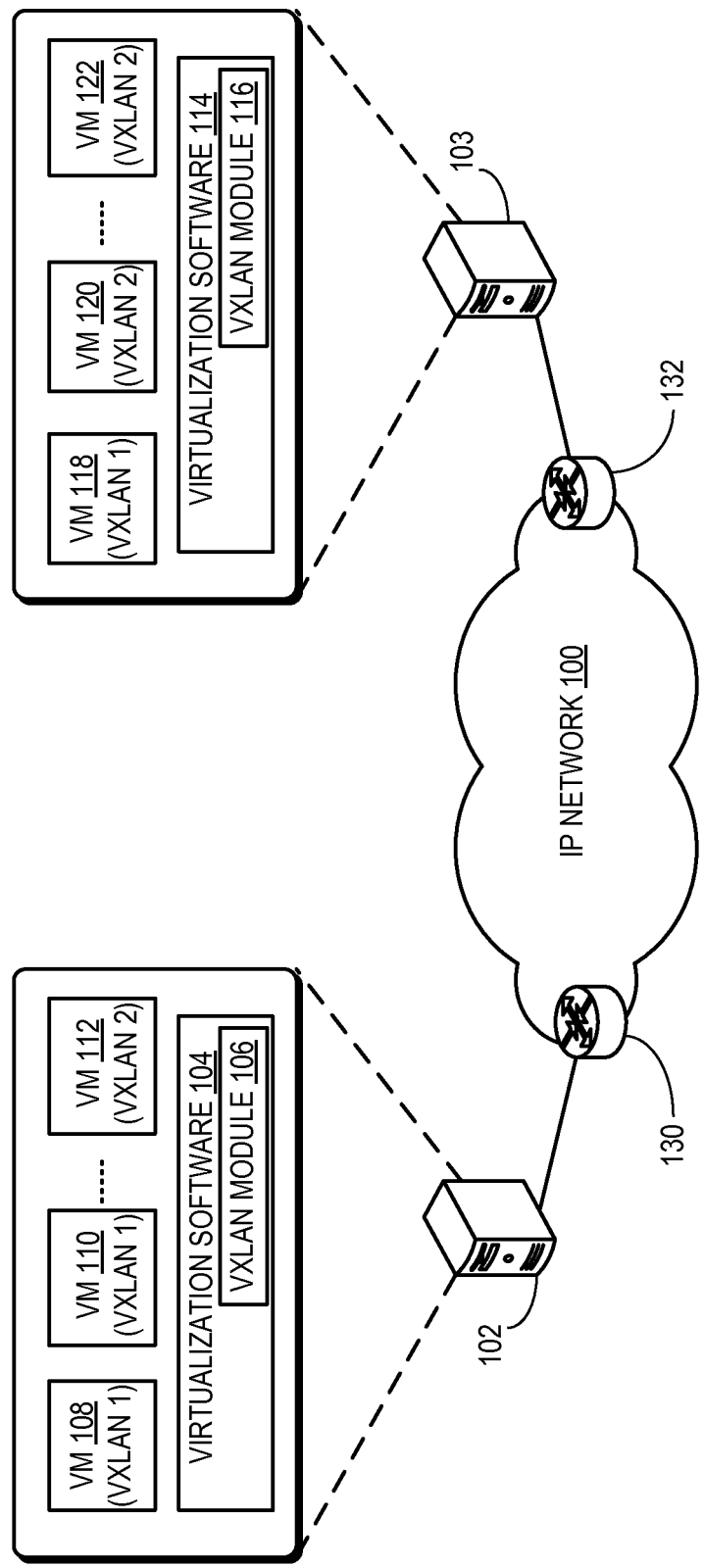
FIG. 1 illustrates an exemplary network architecture that facilitates VXLAN.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Embodiments of the system disclosed herein solve the problem of taking advantage of a PNIC's multiple receive queues for received VXLAN packets by monitoring VXLAN-specific port statistics in a virtualization software's virtual switch and allocating Receive Side Scaling (RSS) receive queues in the PNIC.

Currently, many types of PNICs provide multiple receive queues which facilitate multi-core processing of VM traffic. Typically, at the instruction (such as the NETQUEUE command in the ESX® product family by VMware, Inc. of Palo Alto, Calif.) of the virtualization software (also called hypervisor), a PNIC can allocate one receive queue for each VM. An incoming Ethernet packet is stored in a respective receive queue based on the packet's destination MAC address (and optionally its VLAN tag). This VM-specific queuing mechanism offloads the burden of sorting incoming packets based on their destination VMs from a host's CPU to the PNIC, hence significantly reducing the processing overhead on the CPU. In addition, when the packets stored in these separate receive queues are processed by the virtualization software, multiple processors (for example, processors in a multi-core CPU) can be used. This multi-core processing capability can improve the network throughput.

In general, the virtualization software includes a virtual Ethernet switch and a load balancer (both of which are software modules). The virtual Ethernet switch couples all the VMs on the same host and forwards Ethernet packets between these VMs and to the outside world via the PNIC. The load balancer is responsible for communicating with the PNIC to allocate receive queues on the PNIC based on the number of VMs hosted. Typically, the packets stored in the PNIC's different receive queues can be processed by different processors in a multi-core computing system, which can improve the VM's network throughput.

The load balancer monitors the incoming traffic, and as it detects incoming packets destined for different VMs (wherein each VM is identified by its MAC address and/or VLAN tag), the load balancer instructs the PNIC to allocate one receive queue for each VM. For example, if there are four VMs on a host, the load balancer can allocate four receive queues in the PNIC. When the PNIC receives an Ethernet packet, it stores the packet in one of these receive queues based on the packet's Ethernet destination address (DA). As a result, the processors in the multi-core system can process packets stored in these queues in a round-robin manner.

As mentioned above, the VXLAN feature in a virtualization software automatically encapsulates an Ethernet packet generated by a VM that is part of a VXLAN-enabled Ethernet broadcast domain. FIG. 1 illustrates an exemplary network architecture that facilitates VXLAN. In this example, an IP network 100 couples several conventional layer-2 networks. Specifically, a host 102 is coupled to an IP router 130. Host 102 hosts a number of VMs: 108, 110, and 112. VMs 108 and 110 belong to VXLAN 1, and VM 112 belongs to VXLAN 2. Virtualization software 104 (such as a hypervisor) manages the VMs on host 102, and includes a VXLAN module 106. VXLAN module 106 is responsible for encapsulating and decapsulating the Ethernet packets generated by and destined for VMs 108, 110, and 112.

Similarly, a host 103 is coupled to an IP router 132. Host 103 hosts a number of VMs: 118, 120, and 122. VM 118 belongs to VXLAN 1, and VMs 120 and 122 belong to VXLAN 2. Virtualization software 114 manages VMs 118, 120, and 122, and includes a VXLAN module 116. When VMs within the same VXLAN communicate with each other, the Ethernet packet generated by a VM is encapsulated with an IP header and then delivered to the VXLAN module in the destination physical host (which owns the destination IP address).

For example, when VM 108 communicates with VM 118, VM 108 generates an Ethernet packet with VM 118's MAC address as its MAC DA. (Note that VMs within the same VXLAN are in the same logical layer-2 broadcast domain, and are therefore assumed to learn each other's MAC address.) When this Ethernet packet reaches VXLAN module 106, VXLAN module 106 inspects the packet's MAC source address (SA), MAC DA, and optionally VLAN tag, and determines that both the source (VM 108) and destination (VM 118) belong to VXLAN 1. Furthermore, based on the packet's MAC DA, VXLAN module 106 determines the IP address of the destination physical host 103. In turn, VXLAN module 106 encapsulates this Ethernet packet with a proper VXLAN header and IP header (which will be described in more detail in conjunction with FIG. 2), and transmits this encapsulated packet to IP router 130. Since the encapsulated packet has an IP destination address that is associated with host 103, IP router 130 (and other IP routers in IP network 100) can then make the proper forwarding decision and forwards the encapsulated packet toward host 103.

When host 103 receives the encapsulated packet, VXLAN module 116 first removes the IP header to expose the inner Ethernet packet. Subsequently, based on both the VXLAN identifier (also referred to as "VNI") and the inner Ethernet header's MAC DA, virtualization software 114 forwards the inner Ethernet packet to VM 118. Note that when VXLAN 116 receives the Ethernet packet, it can establish a mapping relationship of the MAC source address (SA) of the inner Ethernet packet (which is VM 108's MAC address) and the IP source address (which is host 102's IP address). Hence, when in the future VM 118 sends an Ethernet packet to VM 108, VXLAN module 116 can perform VXLAN encapsulation with host 102's IP address as the IP destination address.

Figure 2:
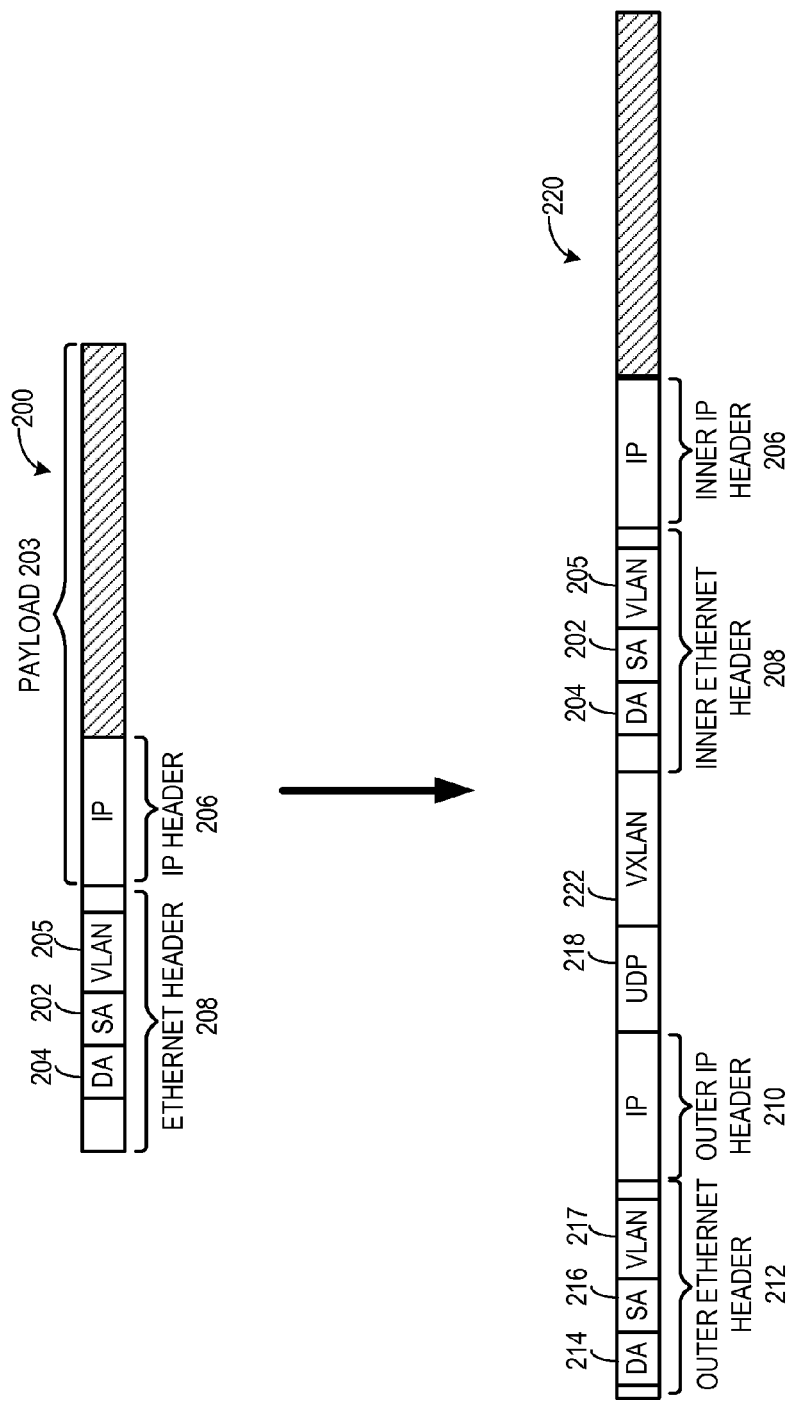
FIG. 2 illustrates header format for a conventional Ethernet packet and its VXLAN encapsulation.

FIG. 2 illustrates header format for a conventional Ethernet packet and its VXLAN encapsulation. In this example, a conventional Ethernet packet 200 typically includes a payload 203 and an Ethernet header 208. Payload 203 can include an IP packet which includes an IP header 206. Ethernet header 208 includes a MAC DA 204, a MAC SA 202, and optionally a VLAN tag 205. MAC DA 204 is the MAC address of a destination VM, and MAC SA 202

A VXLAN module can encapsulate conventional Ethernet packet 200 into an encapsulated packet 220. Encapsulated packet 220 typically includes a VXLAN header 222 which contains a VNI to indicate the VXLAN to which inner Ethernet packet 200 belongs, a UDP header 218 which indicates the transport-layer protocol and port number reserved for VXLAN, and an outer IP header 210. In addition, encapsulated packet 220 includes an outer Ethernet header 212.

Note that UDP header 218 includes a destination UDP port and a source UDP port. The destination UDP port is typically a well-known port reserved for VXLAN traffic, such that the destination host operating system's network protocol stack can process such packets with its VXLAN module. The source UDP port is typically a hash of inner IP header 206's source IP address, destination IP address, source port, and destination port.

In a conventional virtualization environment without VXLAN, when a host receives Ethernet packets destined for VMs hosted on the host, the MAC DAs of these received packets are VM-specific. In other words, packets destined for different VMs have different MAC DAs, and may also have different VLAN tags. These different MAC DAs (and VLAN tags) allow the PNIC to allocate different receive queues and store these packets based on their MAC DA/VLAN tag combination.

In a virtualization environment that supports VXLAN, however, all the VXLAN packets received by a host share the same outer MAC DA and outer VLAN tag (i.e., MAC DA 214 and VLAN tag 217), which are the MAC address and VLAN tag of the receiving host's PNIC. As a result, the PNIC would store all these VXLAN packets in the same, default receive queue, despite the fact that their inner Ethernet packets may be destined for different VMs. In other words, the PNIC can only "see" the VXLAN packet's outer Ethernet header. This problem and its associated issues are illustrated in more detail with reference to FIG. 3.

Figure 3:
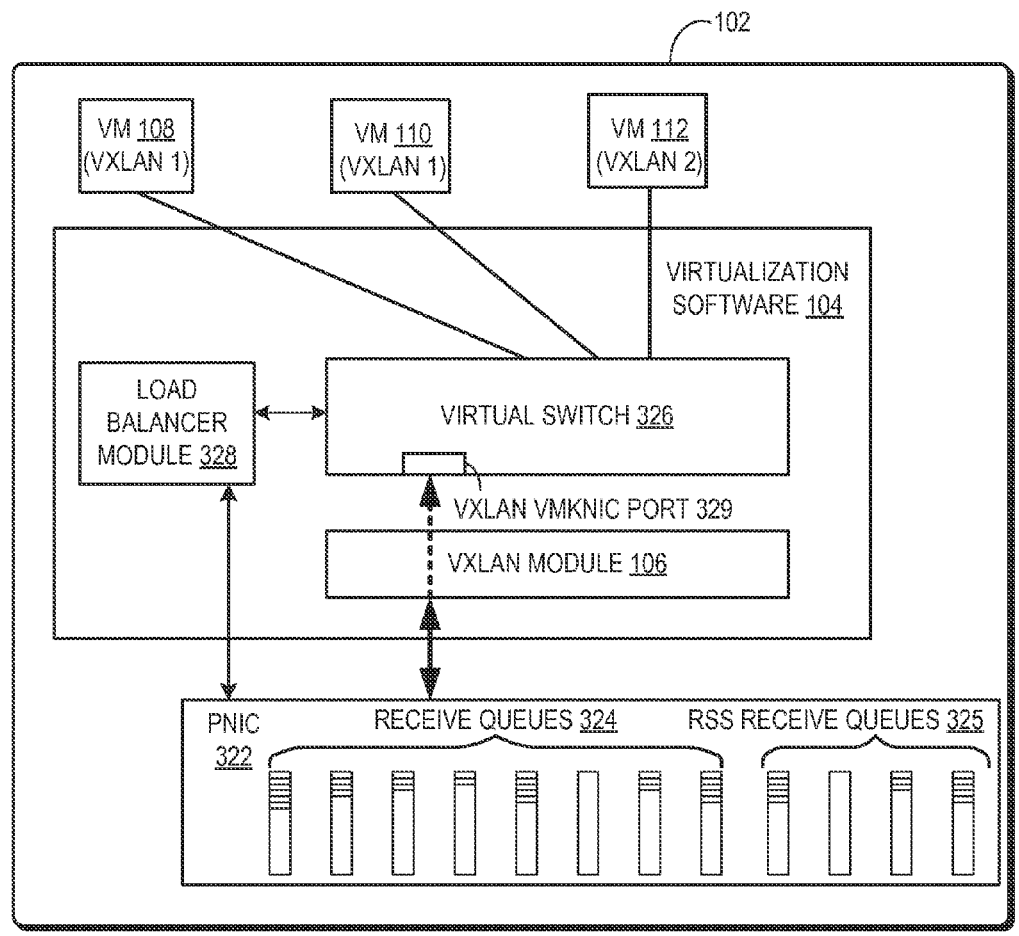
FIG. 3 illustrates an exemplary virtualization software architecture that allows VXLAN encapsulated packets to benefit from multiple receive queues provided by a PNIC.

In the example illustrated in FIG. 3, host 102 includes a PNIC 322. Within virtualization software 104 are a load balancer module 328, a virtual switch 326, and VXLAN module 106. PNIC 322 facilitates a number of receive queues 324. In general, load balancer module 328 monitors the traffic on the ports on virtual switch 326 that are coupled to VMs. Typically, when load balancer module 328 observes packets destined for a particular VM, or when traffic destined for that VM surpasses a predetermined threshold, load balancer module 328 instructs PNIC 322 to allocate one additional receive queues for packets destined for that VM. Similarly, if the traffic on a port on virtual switch 326 falls below the threshold, load balancer module 328 can instruct PNIC 322 to de-allocate the corresponding receive queue. Note for packets whose MAC DA/VLAN tag combination does not match any receive queue, PNIC 322 provides a default queue to store such packets.

When PNIC 322 receives VXLAN encapsulated Ethernet packets, because these packets share the same outer Ethernet header, PNIC 322 would place these packets in the default queue. On the other hand, when these VXLAN packets are decapsulated by VXLAN module 106 and subsequently delivered to the corresponding VMs, load balancer module 328 would instruct PNIC 322 to allocate corresponding receive queues. However, because PNIC 322 cannot process a VXLAN encapsulated packet's inner Ethernet header (i.e., inner Ethernet header 208), PNIC 322 cannot place such packets in the allocated receive queues. Instead, PNIC 322 places all such packets in the default queue. As a result, receive queues 324 cannot benefit the VXLAN encapsulated packets. Furthermore, because all VXLAN encapsulated packets are placed in a common receive queue in PNIC 322, only one CPU core is used to process all VXLAN packets. Consequently, the receive throughput performance of VXLAN packets is reduced considerably compared with the case of non-VXLAN traffic.

To solve this problem, embodiments of the system described herein uses the receive side scaling (RSS) feature which is provided by most types of PNICs. RSS is a network driver technology that enables the efficient distribution of network receive processing across multiple CPUs in multiprocessor systems. When the RSS feature on a PNIC is enabled, the PNIC can be instructed to allocate a number of RSS receive queues 325. When receiving VXLAN encapsulated packets, the PNIC performs a hash function on a VXLAN encapsulated packet's TCP/IP header's 5 tuple, {source IP, destination IP, protocol, source port, destination port}. More specifically, with reference to FIG. 2, the hash function is performed on a VXLAN encapsulated packet's outer IP header 210 (source IP, destination IP, and protocol, which in this case is "UDP") and UDP header 222 (which includes source UDP port and destination UDP port). For all the VXLAN encapsulated packets received by a host, the source IP, destination IP, and protocol are identical (since the source IP is the IP address of the source host, and destination IP is the IP address of the destination host). The destination UDP port is also identical for all the VXLAN encapsulated packets, since it is the well known UDP port corresponding to the VXLAN protocol. The source UDP port, however, would be different for each source/destination VM pair, since the source UDP port number is a hash of the packet's inner TCP/IP header 206. Hence, packets associated with different source/destination VM pairs would result in different hash result, and consequently be placed in different RSS receive queues.

To instruct PNIC 322 to allocate RSS receive queues 325, load balancer module 328 also needs to distinguish VXLAN encapsulated packets from non-VXLAN packets. This is because for non-VXLAN packets, load balancer module 328 should instruct PNIC 322 to allocate regular receive queues 324. To allow load balancer module 328 to distinguish VXLAN traffic from non-VXLAN traffic, load balancer module 328 is configured to monitor a special port on virtual switch 326, namely a VXLAN VMKNIC port 329. A VMKNIC is a virtual network interface used by the virtualization software kernel. VXLAN VMKNIC port 329 is created by virtualization software 104 to receive VXLAN traffic and to handle outgoing traffic that is to be VXLAN encapsulated before it is sent to the uplink to PNIC 322. When PNIC 322 receives VXLAN encapsulated packets, PNIC 322 generally forwards such packets to VXLAN VMKNIC port 329 on virtual switch 326. VXLAN module 106 typically intercepts such packets and decapsulates them before forwarding them to the corresponding VMs.

As mentioned above, load balancer module 328 monitors the traffic on VXLAN VMKNIC port 329, which contains only VXLAN encapsulated packets. When the throughput on VXLAN VMKNIC port 329 surpasses a predetermined threshold, load balancer module 328 instructs PNIC 322 to allocate RSS receive queues 325. After PNIC 322 allocates RSS receive queues 325, PNIC 322 can store incoming VXLAN encapsulated packets in different RSS receive queues based on the hash result of each packet's TCP/IP 5 tuple. In one embodiment load balancer module 328 only needs to issue one RSS receive queue allocation command for PNIC 322 to allocate a predetermined number of RSS receive queues (e.g., 4, 8, or more). Note that for non-VXLAN packets, load balancer module 328 can instruct PNIC 322 to allocate regular receive queues 324, and PINC 322 can store non-VXLAN packets based on their Ethernet DA and VLAN tags.

Figure 4:
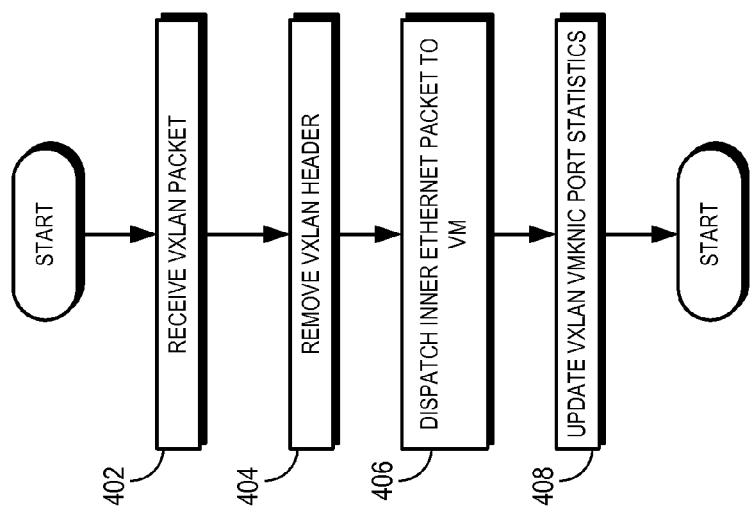
FIG. 4 presents a flow chart illustrating exemplary operation of a VXLAN module to facilitate allocation of receive side scaling (RSS) queues in a PNIC.

FIG. 4 presents a flow chart illustrating exemplary operation of a VXLAN module to facilitate allocation of RSS receive queues in a PNIC. During operation, the VXLAN module receives a VXLAN encapsulated packet which is forwarded by the PNIC (operation 402). The VXLAN module then decapsulates the packet by removing its VXLAN header (operation 404). Subsequently, the VXLAN module processes the packet's inner Ethernet header and dispatches the inner Ethernet packet to the correct VM (operation 406). In addition, the VXLAN module updates the VXLAN VMKNIC port's traffic statistics (operation 408). Note that the port statistics can be represented in various ways, such as Mb/s or packets/s.

Figure 5:
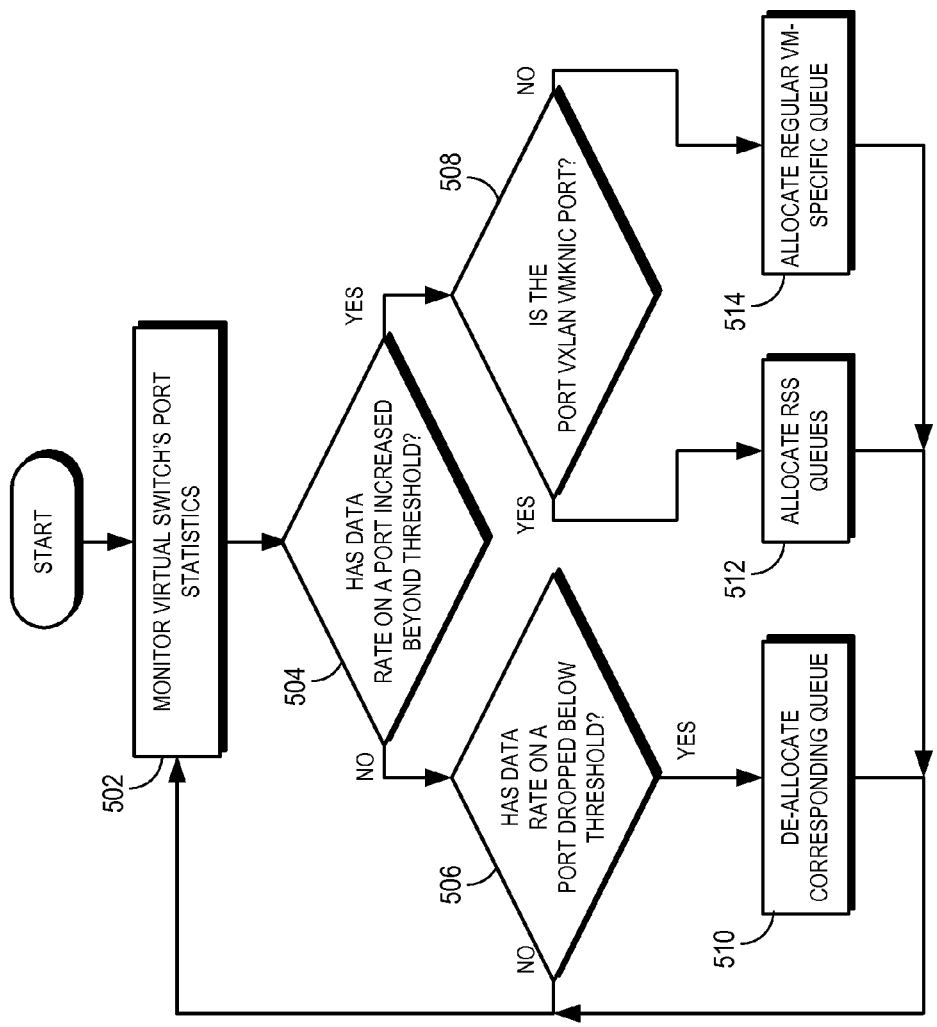
FIG. 5 presents a flow chart illustrating an exemplary process of a load balancer allocating receive queues in a PNIC.

FIG. 5 presents a flow chart illustrating an exemplary process of a load balancer allocating receive queues in a PNIC. During operation, the load balancer monitors the virtual switch's port statistics (operation 502). The load balancer also determines whether the data rate on any port on the virtual switch has increased beyond a predetermined threshold (operation 504). If not, the load balancer further determines whether data rate on a port has dropped below the threshold (operation 506). If so, the load balancer instructs the PNIC to de-allocate the corresponding receive queue (including the RSS queues if the port is the VXLAN VMKNIC port) (operation 510). Otherwise, the load balancer continues to monitor the virtual switch's port statistics (operation 502).

If at least one port has its data rate grown beyond the threshold (i.e., the "YES" branch in operation 504), the load balancer further determines whether the port is a VXLAN VMKNIC port (operation 508). If so, which means that the VXLAN packets are producing a heavy load on the virtual switch, the load balancer instructs the PNIC to allocate RSS receive queues (operation 512). If not, which means the packets causing the data rate increase are regular, non-VXLAN packets, the load balancer instructs the PNIC to allocate a regular VM-specific queue (operation 514). Subsequently, the load balancer continues to monitor the port statistics.

Figure 6:
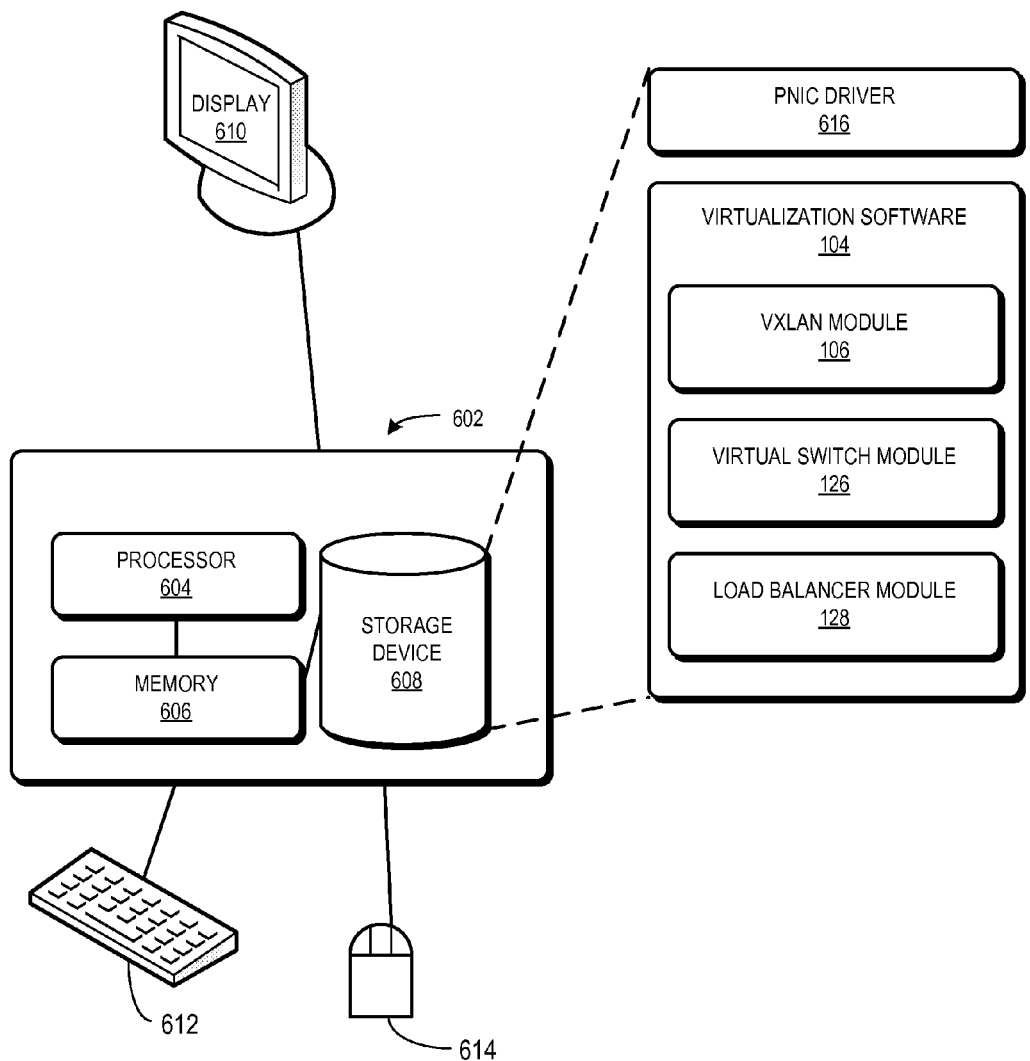
FIG. 6 illustrates an exemplary computer system that facilitates allocation of multiple PNIC receive queues for VXLAN packets.

FIG. 6 illustrates an exemplary computer system that facilitates allocation of multiple PNIC receive queues for VXLAN packets. In this example, a computer system 602 includes a processor 604, memory 606 coupled to processor 604, and a storage device 608 coupled to memory 606. Also included in computer system 602 are a display 610, a keyboard 612, and a pointing device 614. Storage device 608 stores computer instructions which when loaded into memory 606 and executed by processor 604 can cause processor 604 to perform the operations described above.

More specifically, the instructions stored in storage device 608 can include a PNIC driver 616 and virtualization software 104. Virtualization software 104 can in turn include a VXLAN module 106, a virtual switch module 126, and a load balancer module 128. PNIC driver 616 presents an interface between virtualization software 104 and the underlying PNIC hardware. VXLAN module 106 is responsible for encapsulating/decapsulating Ethernet packets generated by or received for the VMs. Virtual switch module 126 implements a software-based Ethernet switch for the VMs. Load balancer module 128 is responsible for allocating and de-allocating regular receive queues as well as RSS receive queues in the PNIC.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for processing encapsulated packets in a computer system running virtualization software that includes a virtual switch, wherein each encapsulated packet includes an outer Ethernet header, an outer IP header, an outer UDP header, and an inner Ethernet header, the method comprising:

monitoring traffic statistics on a dedicated port of the virtual switch, the dedicated port having been created by the virtualization software to be dedicated to incoming packets that have been decapsulated from encapsulated packets and outgoing packets that are to be encapsulated into encapsulated packets; and in response to the traffic statistics being greater than a predetermined threshold, instructing a physical network interface controller to allocate receive side scaling (RSS) receive queues for encapsulated packets, and allowing the physical network interface controller to store encapsulated packets received by the physical network controller in a number of RSS receive queues which facilitates multi-core processing of the received encapsulated packets.

2. The computer-implemented method of claim 1, wherein a respective encapsulated packet is encapsulated based on a VXLAN protocol; and wherein a source UDP port in the encapsulated packet corresponds to a hash of the packet's inner TCP/IP header.

3. The computer-implemented method of claim 2, wherein the monitored dedicated port on the virtual switch is determined to be a virtual machine kernel network interface port dedicated to VXLAN traffic, and further comprising:

determining a packet received by the physical network interface controller is an encapsulated packet based on a header of the received packet.

4. The computer-implemented method of claim 1, further comprising:
allowing the physical network interface controller to store the received encapsulated packets in different ones of the number of RSS receive queues based on a 5-tuple of the packets' outer Ethernet header, outer IP header, and outer UDP header, and
wherein the 5-tuple includes a source IP address, a destination IP address, a protocol name, a source port, and a destination port.

5. The computer-implemented method of claim 1, further comprising:
updating traffic statistics on the monitored dedicated port.

6. The computer-implemented method of claim 1, further comprising:
instructing the physical network interface controller to de-allocate the receive queues in response to the traffic statistics on the monitored dedicated port dropping below the predetermined threshold.

7. A non-transitory storage medium storing instructions which when executed by a processor cause the processor to perform a method for processing encapsulated packets in a computer system running virtualization software that includes a virtual switch, wherein each encapsulated packet includes an outer Ethernet header, an outer IP header, an outer UDP header, and an inner Ethernet header, the method comprising:
monitoring traffic statistics on a dedicated port of the virtual switch, the dedicated port having been created by the virtualization software to be dedicated to incoming packets that have been decapsulated from encapsulated packets and outgoing packets that are to be encapsulated into encapsulated packets; and
in response to the traffic statistics being greater than a predetermined threshold, instructing a physical network interface controller to allocate receive side scaling (RSS) receive queues for encapsulated packets, and allowing the physical network interface controller to store encapsulated packets received by the physical network controller in a number of RSS receive queues which facilitates multi-core processing of the received encapsulated packets.

8. The non-transitory storage medium of claim 7,
wherein a respective encapsulated packet is encapsulated based on a VXLAN protocol; and
wherein a source UDP port in the encapsulated packet corresponds to a hash of the packet's inner TCP/IP header.

9. The non-transitory storage medium of claim 8,
wherein the monitored dedicated port on the virtual switch is determined to be a virtual machine kernel network interface port dedicated to VXLAN traffic, and the method further comprises:
determining a packet received by the physical network interface controller is an encapsulated based on a header of the received packet.

10. The non-transitory storage medium of claim 7,
wherein the method further comprises allowing the physical network interface controller to store the received encapsulated packets in different ones of the number of RSS receive queues based on a 5-tuple of the packets' outer Ethernet header, outer IP header, and outer UDP header, and
wherein the 5-tuple includes a source IP address, a destination IP address, a protocol name, a source port, and a destination port.

11. The non-transitory storage medium of claim 7, wherein the method further comprises updating traffic statistics on the monitored dedicated port.

12. The non-transitory storage medium of claim 7, wherein the method further comprises instructing the physical network interface controller to de-allocate the receive queues in response to the traffic statistics on the monitored dedicated port dropping below the predetermined threshold.

13. A computer system for processing encapsulated packets, wherein each encapsulated packet includes an outer Ethernet header, an outer IP header, an outer UDP header, and an inner Ethernet header, the computer system comprising:
a physical network interface controller;
virtualization software including a virtual switch having a dedicated port, the dedicated port having been created by the virtualization software to be dedicated to incoming packets that have been decapsulated from encapsulated packets and outgoing packets that are to be encapsulated into encapsulated packets; and
a load balancer module coupled to the physical network interface controller and the virtual switch and configured to:
monitor traffic statistics on the dedicated port of the virtual switch; and
in response to traffic statistics being greater than a predetermined threshold, instruct the physical network interface controller to allocate receive side scaling (RSS) receive queues for encapsulated packets, and allow the physical network interface controller to store encapsulated packets received by the physical network controller in a number of RSS receive queues which facilitates multi-core processing of the received encapsulated packets.

14. The computer system of claim 13,
wherein a respective encapsulated packet is encapsulated based on a VXLAN protocol; and
wherein a source UDP port in the encapsulated packet corresponds to a hash of the packet's inner TCP/IP header.

15. The computer system of claim 14, wherein the monitored dedicated port on the virtual switch is determined to be a virtual machine kernel network interface port dedicated to VXLAN traffic, and the load balancer module is further configured to:
determine a packet received by the physical network interface controller is an encapsulated based on a header of the received packet.

16. The computer system of claim 13,
wherein the physical network interface controller is configured to store the received encapsulated packets in different ones of the number of RSS receive queues based on a 5-tuple of the packets' outer Ethernet header, outer IP header, and outer UDP header, and
wherein the 5-tuple includes a source IP address, a destination IP address, a protocol name, a source port, and a destination port.

17. The computer system of claim 13, further comprising a VXLAN module configured to update traffic statistics on the monitored dedicated port.

18. The computer system of claim 13, wherein the load balancer module is further configured to
instruct the physical network interface controller to de-allocate the receive queues in response to the traffic statistics on the monitored dedicated port dropping below the predetermined threshold.

\* \* \* \* \*